(12) United States Patent
Pettigrew et al.

(10) Patent No.: US 12,465,533 B2
(45) Date of Patent: *Nov. 11, 2025

(54) MOBILITY DEVICE RESTRAINING APPARATUS

(71) Applicant: B&D Independence, Mount Carmel, IN (US)

(72) Inventors: Mark Pettigrew, Mount Carmel, IL (US); Michael Evans, Mount Carmel, IL (US); Luke Turpin, Mount Carmel, IL (US); Larry Dean Michels, Mount Carmel, IL (US)

(73) Assignee: B&D Independence, Mount Carmel, IN (US)

( * ) Notice: Subject to any disclaimer, the term of this patent is extended or adjusted under 35 U.S.C. 154(b) by 541 days.

This patent is subject to a terminal disclaimer.

(21) Appl. No.: 17/958,626

(22) Filed: Oct. 3, 2022

(65) Prior Publication Data

US 2023/0023107 A1 Jan. 26, 2023

Related U.S. Application Data

(63) Continuation of application No. 16/822,554, filed on Mar. 18, 2020, now Pat. No. 11,478,389, which is a
(Continued)

(51) Int. Cl.
*A61G 3/00* (2006.01)
*A61G 3/02* (2006.01)
(Continued)

(52) U.S. Cl.
CPC ........... *A61G 3/062* (2013.01); *A61G 3/0209* (2013.01); *A61G 3/0808* (2013.01)

(58) Field of Classification Search
CPC ..... A61G 3/062; A61G 3/0209; A61G 3/0808
See application file for complete search history.

(56) References Cited

U.S. PATENT DOCUMENTS 4,062,209 A 12/1977 Downing et al.
4,113,270 A * 9/1978 Barecki ............... A61G 3/0808
410/20
(Continued)

FOREIGN PATENT DOCUMENTS

KR 20140075509 A 6/2014
KR 101764141 B 8/2017

OTHER PUBLICATIONS

International Search Report, International Searching Authority, International Application No. PCT/US2018/054949, Feb. 22, 2019, 3 pages.
(Continued)

*Primary Examiner* — Steven O Douglas
(74) *Attorney, Agent, or Firm* — Daniel Tallitsch; Tyler Schultz

(57) ABSTRACT

A restraint apparatus for securing a mobility device in a vehicle includes a base configured to being mounted to a floor of the vehicle, a support coupled to the base and extending upward therefrom, and a backing plate adjustably coupled to the support. The backing plate defines a channel to provide vertical adjustment of the backing plate with respect to the support. An upper support is pivotally coupled to the backing plate, and a claw assembly is coupled to the upper support. The claw assembly includes a claw member and a latching member, where the latching member is pivotally coupled to the claw member to enable pivotal movement between an unlatched position and a latched position. A control system operably controls the pivotal movement of the latching member between its latched position to its unlatched positions. In the unlatched position, the claw assembly provides an opening for receiving the device.

20 Claims, 11 Drawing Sheets

Related U.S. Application Data continuation of application No. PCT/US2018/054949, filed on Oct. 9, 2018.

(60) Provisional application No. 62/573,948, filed on Oct. 18, 2017.

(51) Int. Cl.
*A61G 3/06* (2006.01)
*A61G 3/08* (2006.01)

(56) References Cited

U.S. PATENT DOCUMENTS

| | | | |
|---|---|---|---|
| 5,186,585 | A | 2/1993 | Sousa et al. |
| 5,344,265 | A | 9/1994 | Ullman et al. |
| 5,628,595 | A | 5/1997 | Harris |
| 6,474,916 | B2 | 11/2002 | Constantin |
| 6,698,983 | B1 | 3/2004 | Kiernan et al. |
| 7,708,507 | B2 | 5/2010 | Feng |
| 8,650,735 | B2 | 2/2014 | Johnson et al. |
| 9,272,654 | B1 | 3/2016 | Powell |
| 9,629,760 | B1 | 4/2017 | Tucker |
| 11,234,873 | B2 | 2/2022 | Pedersen |
| 2003/0012617 | A1 | 1/2003 | Constantin |
| 2005/0214104 | A1* | 9/2005 | Strong .................. A01M 31/02 414/546 |

OTHER PUBLICATIONS

Swedish Search Report, Swedish Patent and Registration Office, Swedish Application No. 2050485-8, dated Dec. 22, 2020, 2 pages.
Written Opinion of the International Searching Authority, International Searching Authority, International Application No. PCT/US2018/054949, Feb. 22, 2019, 10 pages.

\* cited by examiner

MOBILITY DEVICE RESTRAINING APPARATUS

RELATED APPLICATIONS

This application is a continuation application of U.S. patent application Ser. No. 16/822,554, filed Mar. 18, 2020, which is a continuation of International Patent Application Ser. No. PCT/US2018/054949, filed Oct. 9, 2018, which claims the benefit of U.S. Provisional Patent Application Ser. No. 62/573,948, filed Oct. 18, 2017, the disclosures of which are hereby incorporated by reference in their entirety.

FIELD OF THE INVENTION

The present disclosure relates generally to devices for securing a mobility device, such as a wheelchair, within a vehicle, and more particularly to a securing device that locks a mobility device in a desired position in a mobility vehicle or on a lifting device that is installed in or on a mobility vehicle or trailer.

BACKGROUND

It has remained a problem in the mobility vehicle industry to provide an economical means for securing a mobility device, such as a wheelchair, in a safe manner and fixing the mobility device in a desired position that is easily engaged or disengaged by the mobility device occupant without additional assistance.

Throughout the years, multiple solutions for securing a mobility device have been proposed. These include various tie-down devices, locking mechanisms affixed to the vehicle floor and provided with pivoting arms to hold the mobility device in place, one or more post members extending vertically from the vehicle floor with mobility device mounted locking devices engaging the vertical posts, side press assemblies, as well as many other mobility device engaging and locking devices.

The current methods available can be substantially difficult for a person with a disability to operate on their own. Similarly, in the event of an emergency current methods are difficult and cumbersome to disengage or remove, and can remain in the way after removal. Other methods also can reduce ground clearance and prevent a mobility device, such as a collapsible wheelchair, from being collapsed so as to take up less space within the vehicle.

Despite the time, effort and monies expended, there remains a need to provide an economical means for securing a mobility device in a safe and easy manner, and fixing the mobility device in a desired position that is easily engaged or disengaged by the mobility device occupant without additional assistance and allow for the full function of the mobility device when in the locked position.

BRIEF SUMMARY OF THE INVENTION

In one embodiment of the present disclosure, a device for securing a mobility device in a vehicle includes a base member configured to be coupled to the floor of a vehicle. A vertical support member can extend perpendicularly from the base member. A secondary member can be adjustably coupled to the vertical support member and configured to be vertical adjustable in height with respect to the base member. One or more coupling arms can be attached to the vertical support member. The coupling arms can comprise a receiving means, securing means, and locking means. A locking system comprising a solenoid and a cable system coupled to the locking means to provide a user control of the locking means engagement of the securing means in an open of close position.

In another embodiment, a restraint apparatus for securing a mobility device in a vehicle includes a base configured to being mounted to a floor of the vehicle; a support coupled to the base and extending upward therefrom; a backing plate adjustably coupled to the support, the backing plate defining a channel to provide vertical adjustment of the backing plate with respect to the support; an upper support pivotally coupled to the backing plate; a claw assembly coupled to the upper support, the claw assembly comprising a claw member and a latching member, the latching member being pivotally coupled to the claw member about a pivot axis to enable the latching member to pivot between an unlatched position and a latched position; and a control system for operably controlling the pivotal movement of the latching member between its latched position to its unlatched positions; wherein, in the unlatched position, the claw member and latching member provide an access opening configured for receiving the mobility device; wherein, in the latched position, the latching member blocks the access opening.

In one example of this embodiment, a second claw assembly is coupled to the upper support and comprises a second claw member and a second latching member, the second latching member being pivotally coupled to the second claw member to enable the second latching member to pivot between an unlatched position and a latched position. In a second example, an arm has a first end coupled to the claw assembly and a second end adjustably coupled to the upper support, where the arm comprises a slot to enable lateral adjustment of the claw assembly relative to the upper support. In a third example, a handle is movably coupled to the upper support, the handle operably controlling pivotal movement of the upper support between a raised position and a lowered position. In a fourth example, the handle comprises a leg coupled to a latch; the backing plate forming an extension having a first slot and a second slot defined therein; wherein the latch is disposed in the first slot in the raised position and in the second slot in the lowered position; further wherein, movement of the handle relative to the upper support releases the latch from either the first slot or the second slot to enable pivotal movement of the upper support relative to the base.

In a fifth example, the handle comprises a second leg coupled to a second latch; the backing plate forming a second extension having a first slot and a second slot defined therein; wherein the second latch is disposed in the first slot in the raised position and in the second slot in the lowered position; further wherein, movement of the handle relative to the upper support releases the second latch from either the first slot or the second slot defined in the second extension to enable pivotal movement of the upper support relative to the base. In a sixth example, a housing is removably coupled to the upper support, the housing enclosing at least a portion of the control system.

In a seventh example, the claw assembly comprises a cover for at least partially covering the latching member and control system. In an eighth example, the control system comprises a solenoid and a user control, wherein the user control is electrically coupled to the solenoid such that actuation of the user control energizes the solenoid to operably control pivotal movement of the latching member from its latched position to its unlatched position. In a ninth example, a release lever is operably coupled to the control system, wherein movement of the release lever induces the control system to operably control pivotal movement of the latching member from its latched position to is unlatched position.

In a tenth example, the apparatus may include a switch coupled to the claw member, the switch including a switch arm disposed in contact with the latching member in the latched position and spaced from the latching member in the unlatched position. In another example, the apparatus may include a latch pivotally coupled to the claw member about a different pivot axis than the latching member, the latch comprising a tab; wherein, the latching member comprises a notch defined therein for receiving the tab in the latched position. In yet another example, the restraint apparatus may include a first pin coupled to the latching member; a second pin coupled to the latch; a spring coupled between the first pin and the second pin, wherein the spring biased the latching member to its unlatched position.

In a further example of this embodiment, the apparatus may include a first stop and a second stop, the first and second stops configured to limit movement of the latching member between its latched position and unlatched position; wherein, the first stop is formed by the engagement of the tab in the notch in the latched position; wherein, the second stop is formed by contact between the first pin and the claw member in the unlatched position. In yet a further example, the control system comprises a cable coupled at one end to the solenoid and at an opposite end to the latch; wherein, when the solenoid is energized, the cable operably moves the latch until the tab disengages from the notch in the latching member.

In another embodiment of the present disclosure, a restraint apparatus for securing a mobility device in a vehicle includes a base configured to being mounted to a floor of the vehicle; a support coupled to the base and extending upward therefrom; a backing plate adjustably coupled to the support, the backing plate defining a channel to provide vertical adjustment of the backing plate with respect to the support; an upper support pivotally coupled to the backing plate; a first claw assembly coupled to the upper support, the first claw assembly comprising a first claw member and a first latching member, the first latching member being pivotally coupled to the first claw member about a first pivot axis to enable the first latching member to pivot between an unlatched position and a latched position; a second claw assembly coupled to the upper support and comprising a second claw member and a second latching member, the second latching member being pivotally coupled to the second claw member about a second pivot axis to enable the second latching member to pivot between an unlatched position and a latched position; and a control system for operably controlling the pivotal movement of the first and second latching members between their respective latched positions and unlatched positions; wherein, in the unlatched position, the first and second claw members and latching members provide an access opening configured for receiving the mobility device; wherein, in the latched position, the first and second latching members block the access opening.

In one example of this embodiment, the restraint apparatus may include a handle movably coupled to the upper support, the handle operably controlling pivotal movement of the upper support between a raised position and a lowered position. In another example, the control system comprises a solenoid and a user control, wherein the user control is electrically coupled to the solenoid such that actuation of the user control energizes the solenoid to operably control pivotal movement of the first and second latching members from their respective latched positions to their unlatched positions.

In a further embodiment of the present disclosure, an apparatus for restraining movement of a wheelchair includes a base configured to being mounted to a ground surface; a support coupled to the base; a backing plate vertically adjustably coupled to the support; an upper support pivotally coupled to the backing plate; a claw assembly coupled to the upper support, the claw assembly comprising a claw member and a latching member, the latching member being pivotally coupled to the claw member to enable the latching member to pivot between an unlatched position and a latched position; and a control system for operably controlling the pivotal movement of the latching member between its latched position to its unlatched positions, wherein the control system comprises a solenoid comprising an energized state and a de-energized state; a user control electrically coupled to the solenoid, wherein actuation of the user control energizes the solenoid to operably control movement of the latching member from its latched position to its unlatched position; a switch coupled to the claw member, the switch including a switch arm disposed in contact with the latching member in the latched position and spaced from the latching member in the unlatched position; and a visual indicator electrically coupled to the switch, the visual indicator displaying a first signal when the switch arm is in contact with the latching member and a second signal when the switch arm is not in contact with the latching member.

In one example of this embodiment, a release lever may be operably coupled to the control system, wherein movement of the release lever energizes the solenoid to operably control pivotal movement of the latching member from its latched position to is unlatched position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION OF THE INVENTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Although the accompanying description below is discussed in relation to a wheelchair, a device for securing a mobility device in accordance with this disclosure is not limited only to wheelchairs. A device for securing a mobility device in accordance with this invention may also be used with other mobility devices, such as scooters, manually propelled wheelchairs, and so forth.

Figure 1:
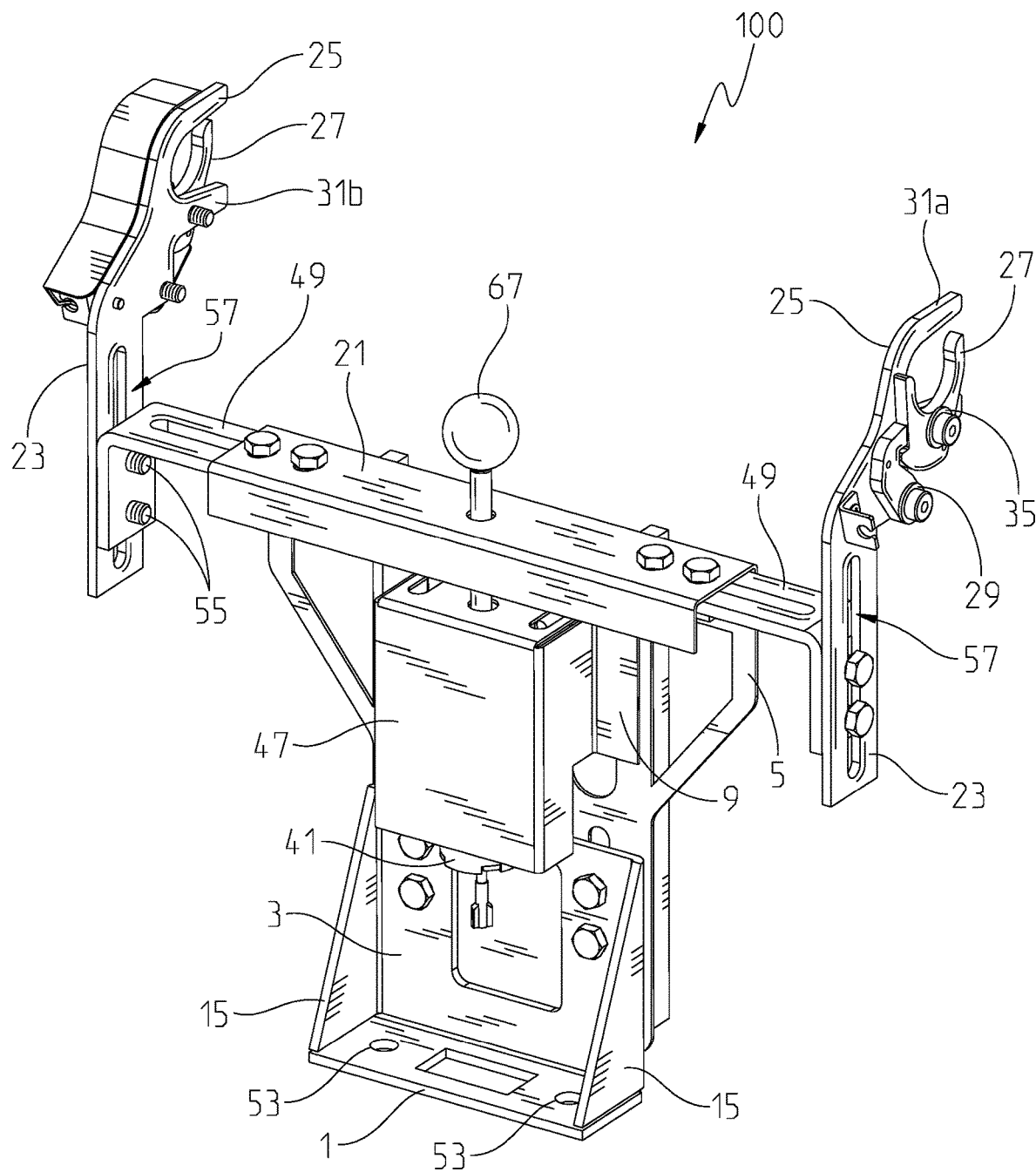
FIG. 1 is a rear perspective view of one embodiment of a mobility device restraining apparatus.
Figure 2:
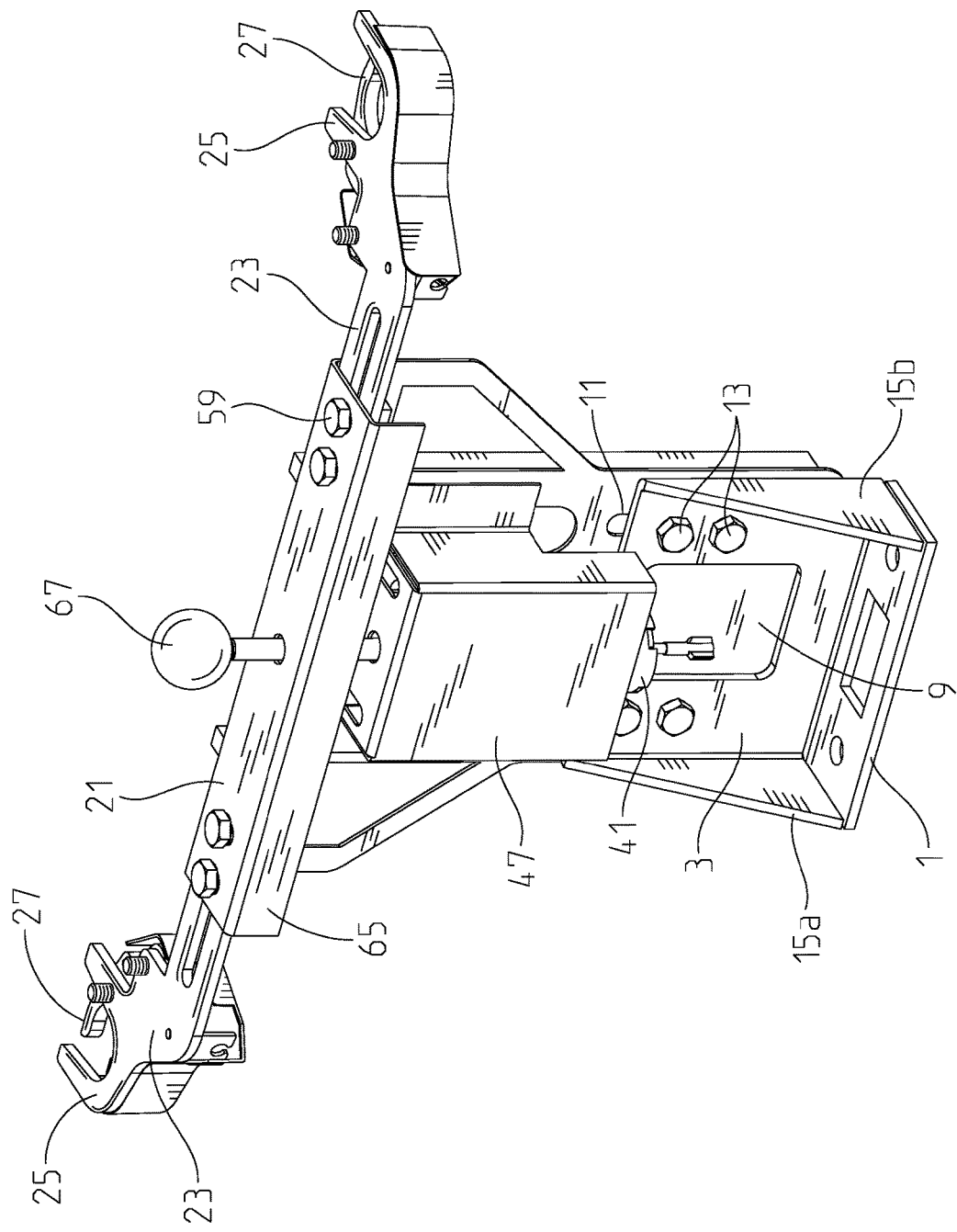
FIG. 2 is a rear perspective view of a related embodiment of a mobility device restraining apparatus.

Referring to FIGS. 1 and 2 of the present disclosure, an embodiment of a mobility device restraining apparatus is shown generally at 100. The restraining apparatus 100 can include a base member 1 configured to be coupled to a floor of a vehicle or other desired area to restrain a mobility device. The base member 1 can be coupled to the floor of a vehicle using any suitable means, such as a fastener, bolt and nut, welding, or adhesive. A vertical support member 3 can extend vertically a pre-determined distance from the base member 1. In one embodiment, the vertical support member 3 can extend perpendicularly from the base member 1. Similarly, the vertical support member 3 can be fixedly or moveable coupled to the base plate 1. The vertical support member 3 can be movable in to adjust the angle from which the base member 1 it extends and vertically movable to adjust the distance from the base member to a top portion 5 of the vertical support member 3.

In one embodiment, a bottom portion 7 of the vertical support member 3 can be hingedly coupled to the base member 1. Additionally, side support member(s) 15 can be coupled to the vertical support member 3 and the base member 1 to provide additional structural rigidity to the apparatus 100. Similarly, a secondary member 9 can be coupled to the vertical support member 3. In one embodiment, the secondary member 9 or vertical support member 3 can have one or more channels 11 configured to allow the secondary member 9 to be adjustably coupled to the vertical support member 5. One or more fasteners can be used to couple the secondary member 9 to the vertical support member 3. The secondary member 9 can have a top end and a bottom end. In one embodiment, the channel(s) 11 can run almost the entire length between the top end and bottom end of the secondary member 9.

The top end may include a ledge 21 formed or coupled using any suitable means, such as a fastener 13. In one exemplary embodiment, the ledge 21 can have one or more apertures configured for coupling one or more coupling arms 23 to the secondary member 9. Additionally, in one exemplary embodiment, the ledge 21 can further include a lip that extends downward from the edge of the ledge to form a channel for receiving the coupling arms 23. Each arm 23 can comprise a receiving means 25 and a securing means 27 on one end of the coupling arms 23. A channel can be formed in between the first end and second end of the coupling arms 23 to allow for the adapters to be adjustable horizontally with respect to the ledge 21. This can allow a user to easily adjust the width of the position of receiving members 25 to be adaptable to various sizes of mobility devices. The coupling arms 23 may be secured to the secondary member 9 using any suitable means such as a fastener 59 in a desired position by a user. A backing plate (not shown) can further be used to ensure a rigid coupling of the coupling arms 23 to the secondary member 9. The backing plate can have one or more apertures configured to accept fasteners to securing the coupling arms 23.

In the embodiment of FIGS. 1 and 2, there can be a first coupling arm 23 and a second coupling arm 23 configured to receive a portion of a mobility device. One or both of the arms 23 can further include a locking means 29 configured to interface and engage with the securing means 27 to ensure that the mobility device does not unintentionally become disengaged from the coupling arms 23 and the securing means 27. In one exemplary embodiment, the locking means 27 can be configured to have an interfacing portion, such a hook, to engage a tab on the securing means 27. In this way, the securing means 27 cannot be rotated out of a secured position, wherein a prong portion spans at least a portion of the space between the two prongs 31 of the receiving portion 25 thereby preventing a portion of the mobility device from being removed from the receiving portion 25.

Moreover, the receiving portion 25 of the coupling arms 23 can be formed in a u-shaped configuration to easily receive a portion (e.g., an axle) of the mobility device. Each receiving means 25 can include one or more prong portions 31 that extend outwardly from a support portion of the receiving means 25 to help with guiding the mobility device into the support portion of the receiving means 25. The securing means 27 can be pivotally coupled to the receiving means 25 using any suitable means such as a coupling means 35 that can be inserted through corresponding openings on the receiving means 25 and the securing means 27. The coupling means 35 allows for the securing means 27 to be easily pivoted between an open and a closed position with respect to the receiving means 25. In an exemplary embodiment, the securing means 27 is configured in a similar shape as the receiving means 25 and can have one or more prong portions.

The securing means 27 can be positioned in a manner with respect to the receiving means 25, where in the open position, a prong portion of the securing means 27 can extend into the receiving area between the prong portions 31 of the receiving means 25. When a portion of the mobility device contacts the prong portion of the securing means 27, the securing means 27 can pivot about an axis defined through the coupling means 35 allowing the other prong portion of the securing means 27 to be positioned around a portion of the mobility device such as its rear axle.

The locking means 29 can engage a portion of the securing means 27 to lock the securing means 27 in place with respect to the receiving means 25. In one embodiment, a biasing means (not shown), such as a spring, can be used to keep the locking means in tension and securely engaged with the securing means 27. When in the locked position, one of the prong portions of the securing means 27 can extend perpendicularly with respect to the two prong portions 31 of the receiving means 25, as shown in FIG. 1.

The locking means 29 can be communicatively coupled to a locking system (not shown). In one exemplary embodiment, the locking system can include a solenoid 41 and a cable system (not shown), wherein one or more cables (not shown) from the cable system are communicatively coupled to the locking means 29. The solenoid 41 and a portion of the cable system can be located in a locking means housing 47, which can be located remotely from the apparatus 100, or alternatively, can be coupled to a portion of the apparatus, such as the vertical support member 3 or the secondary member 9 as shown in FIGS. 1 and 2. The solenoid 41 can be coupled directly to the housing 47 or alternatively to the secondary member 9 or vertical member 3. The cable system can include one or more cables coupled to a portion of the solenoid 41. Similarly, the other end of the cable can be coupled to the locking means 29. When the solenoid 41 is engaged, the solenoid 41 can pull on one or more cables to disengage the locking means 29 from the securing means 27.

The securing means 27 can then be freely pivoted and rotated to allow a portion of the mobility device to be removed from the support portion of the receiving means 25. The securing means 27 can then be positioned back to its original position wherein a prong portion is in position to aid in receiving a portion of the mobility device. The prong portion can extend partially into the receiving area in between the two prongs 31 of the receiving means 25.

The biasing means allows for the locking means 29 to automatically engage a tab on the securing means 27 once it is moved into position as a portion of the mobility device is received by the securing means 27. This ensures that the locking means 29 can manually engage the securing means 27 without the need of an external power source. In one exemplary embodiment, the locking means 29 can use a servo motor that is communicatively coupled to a locking switch to allow a user to control the locking means 29. The servo motor can move the locking means 29 to and from an engaged position either directly driving the at the pivot point or alternatively using a cable system similar to that of the solenoid system. A manual release (not shown) can be used to ensure that the locking means 29 can be disengaged in the absence of a power source or malfunction of the servo motor.

The solenoid 41 can be actuated either manually or electronically using an electronic actuation system. The electronic actuation system can be hardwired to a power source, such as a vehicle battery or alternative power source. A solenoid plunger 67 can be mechanically coupled to the solenoid 41 and allow for manual engagement and disengagement of the solenoid when a power source is not available or in fully manually embodiments of the apparatus 100.

In the illustrated embodiment of FIGS. 1 and 2, the base member 1 can have one or more apertures 53 used for coupling the base member to a portion of a vehicle, such as a vehicle floor board. Any suitable means, such as fasteners (not shown) can be used to couple the base member 1 to a portion of the vehicle. Similarly, the vertical support member 3 can have one or more apertures for coupling a secondary member 9 using fasteners 55. Additionally, fasteners 55 can be used to couple other components of the apparatus 100 to each other, including but not limited to the coupling arms 23 to the secondary member 9 and the coupling arms 23 to the vertical adapters The apparatus 100 can further include one or more vertical adapters (not shown) that can be coupled to the ledge 21 of the secondary member 9. The vertical adapters can have a first end and a second end. A channel can be formed in between the first end and second end to allow for the adapters to be adjustable horizontally with respect to the ledge 21. This can allow a user to easily adjust the width of the position of the receiving members 25 to be adaptable to various sizes of mobility devices. A coupling portion can be formed at one end of the vertical adapters to allow for the coupling arms to be coupled in a vertical orientation with respect to the top ledge of the secondary member 9. Alternatively, the coupling arms 23 can be coupled directly to the secondary member 9 in a horizontal orientation. By allowing for both a vertical and horizontal configurations, the apparatus is better adaptable to be used with various mobility devices including, but not limited to, different sizes of wheelchairs.

Similarly, the coupling arms 23 can be configured to have an L-shaped bend to reconfigure the orientation of the receiving means 25 of the coupling arms 23. In some embodiments, the receiving means can be hingedly connected to the coupling arms 23 and configured to allow a user to adjust the orientation of the receiving means 25 with respect to the mobility device. This can provide additional customization of the apparatus for various mobility devices 200.

The apparatus 100 can further include one or more protective sleeves (not shown) configured to reduce rattle and damaging of the finish of a mobility device. The protective sleeves can be formed around the receiving means 25 and securing means 27 of the apparatus 100. The protective sleeves may be formed of a plastic material or similarly can be a coating applied to the receiving means 25 and securing means 27 to act as a protective sleeve. In one exemplary embodiment, the protective sleeve can have an approximate shape of the receiving means 25 and act as a housing for the securing means 27.

By having two points of securement with a mobility device, the mobility device is substantially more secure within the vehicle and less likely to swing around or become dislodged in the occurrence of an accident or the vehicle needing to make an abrupt stop. Additionally, the adjustability of the coupling arms 23, secondary member 9, and vertical adapters allow for increased modulation and adjustment of the apparatus 100. The adjustability allows for both horizontal and vertical adjustment of the receiving means 25, as well as horizontal and vertical orientation of the receiving means 25. By being adjustable, the apparatus 100 can be used with a wide variety of mobility devices and models of wheelchairs in both a collapsed and uncollapsed configuration.

Figure 3:
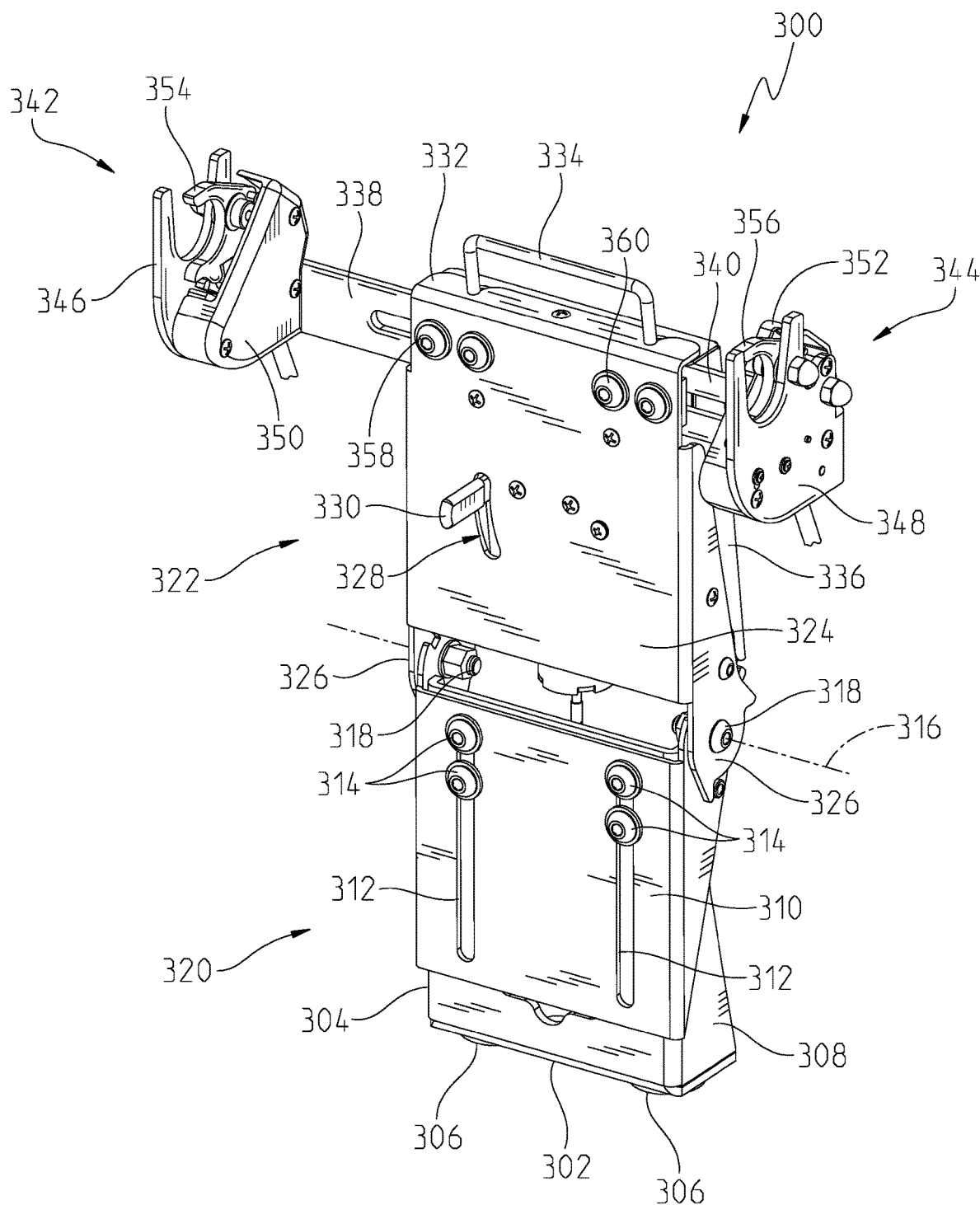
FIG. 3 is a front perspective view of another embodiment of a mobility device restraining apparatus.
Figure 4:
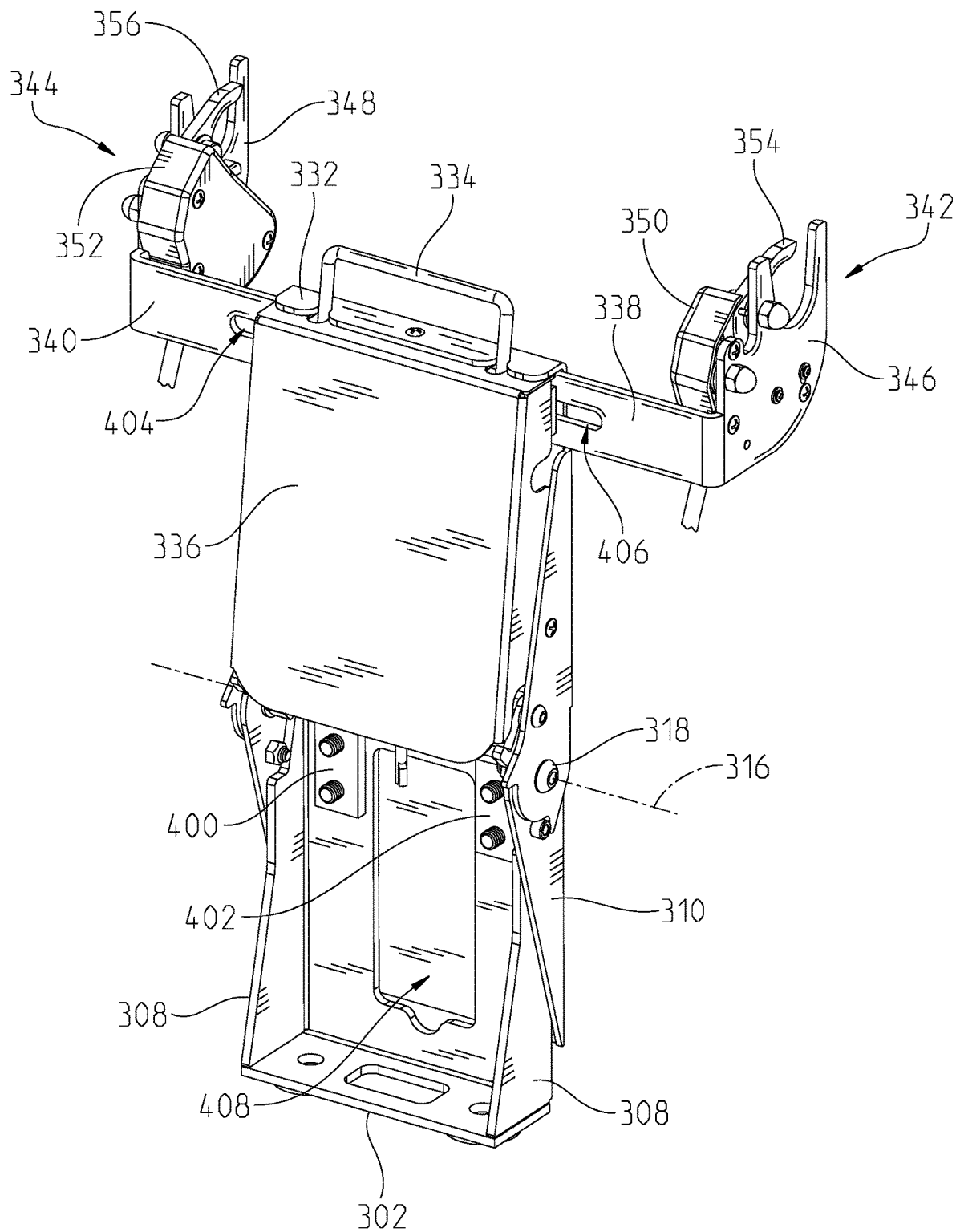
FIG. 4 is a rear perspective view of the apparatus of FIG. 3.

In FIGS. 3 and 4, another embodiment of a restraining apparatus for a mobility device according to the present disclosure is illustrated. Here, the restraining apparatus 300 may include a lower portion 320 and an upper portion 322, whereby the upper portion 322 is pivotally coupled to the lower portion 320 about a pivot axis 316. As shown, the pair of fasteners 318 define the pivot axis 316. This will be address in further detail below.

The lower portion 320 may include a base 302, a support body 304, and a pair of opposing side supports 308. One or more feet 306 may be coupled to a bottom side of the base 302 and engage a floor, for example, of a transport vehicle (not shown). The transport vehicle may include a passenger vehicle such as a van, bus, motorcoach, sport-utility vehicle, taxi vehicle, etc. In other embodiments, the transport vehicle may include an airplane, helicopter, or train. Thus, the apparatus 300 may be mounted to the floor of any type of passenger vehicle so that a wheelchair or other mobility device may be removably secured thereto. In a broader context, however, the apparatus may be mounted to any floor or ground surface for coupling to a mobility device.

In order to mount the apparatus to a floor or other surface, the base 302 may include one or more apertures 700 (see FIG. 7) through which a fastener (not shown) or the like may be used.

Returning to FIGS. 3 and 4, the restraining apparatus 300 may also include a backing plate 310 coupled to the support body 304. The backing plate 310 may include a pair of vertical channels 312 defined therein and spaced laterally from one another as shown. One or more fasteners 314 may be used to couple the backing plate 310 to the support body 304 by being inserted at various locations or heights in the channels 312. The vertical channels 312 allow for the backing plate 310 to be vertically adjustable relative to the support body 304. This adjustability allows the apparatus 300 to serve different sizes of mobility devices including wheelchairs. In other words, the restraint apparatus may be adjusted vertically to meet the needs of a variety of mobility devices having different heights. As will be described below, the restraint apparatus 300 is also adjusted laterally or horizontally in order to accommodate a wide range of mobility devices having different widths.

As shown in FIG. 4, a first plate 400 and a second plate 402 are shown on an inside portion of the support body 304 for coupling with the fasteners 314 and securing the backing plate 310 to the body 304. In one example, the first plate 400 and second plate 402 may include threaded holes such that the fasteners 314 are able to be screwed into the threaded holes of both plates. Other means for coupling the backing plate 310 to the support body 304 is possible and this embodiment is not intended to be limiting.

The support body 304 may include a larger opening 408 as shown in FIG. 4. This reduction of material allows the apparatus to use less material, which costs less money and weighs less thereby making the apparatus more easily transportable.

Referring now to the upper portion 322 of the apparatus 300, an upper support 324 may be pivotally coupled to the backing plate 310 about the pivot 318. In FIG. 3, the upper support 324 may include a pair of side pivot members 326 integrally formed with the rest of the upper support 324 such that the pivot members 326 extend along an outer side edge as shown. The pivot members 326 each include apertures through which the pivot pin or fastener 318 is coupled.

The upper support 324 may include a top portion 332 and a slot 328 defined therein. A safety release lever 330 protrudes from through the slot 328 as shown in FIG. 3. The safety release lever 330 will be described in further detail below, but for now it is sufficient to note that the safety release lever 330 provides for a manual control to disengage the mobility device, e.g., wheelchair, from the restraint apparatus 300 at any time.

The upper portion 322 may also include a housing 336 coupled to the upper support 324. One or more fasteners may connect the housing 336 to the support 324, as shown in FIGS. 3 and 4. The housing 336 and support 324 define an interior in which electrical components such as a solenoid 516 (FIG. 5) and the like are disposed. Moreover, a handle 334 is partially disposed within the interior, but it also extends from the interior as shown in FIGS. 3 and 4. The handle 334 enables a release of the upper portion 322 from the lower portion 320 to enable the upper portion 322 to pivot relative thereto about axis 316. This will be described in further detail below.

The width of the mobility device, such as the wheelchair, may vary based on type and design of the device. As such, the restraint apparatus 300 is also configured to adjust laterally in a width-wise direction to accommodate the different widths and sizes of mobility devices. For example, the apparatus 300 may include a first arm 338 and a second arm 340 which extend laterally from the housing 336. At one end of the first arm 338, a first claw assembly 342 may be provided for releasably coupling to the mobility device at a first location. Likewise, at one end of the second arm 340, a second claw assembly 344 may be provided for releasably coupling to the mobility device at a second location.

The first claw assembly 342 may include a first claw member 346, a cover 350, and a first locking member 354. Similarly, the second claw assembly 344 may include a second claw member 348, a cover 350, and a second locking member 356. The covers 350 provide protection to internal electrical components that may be electrically coupled to the solenoid 516, as will be described below. Moreover, the first locking member 354 may be positioned between the first claw member 346 and the respective cover 350, and the second locking member 356 may be disposed between the second claw member 348 and the respective cover 350.

Referring to FIGS. 3 and 4, the first arm 338 and second arm 340 each include an adjustment slot. The first arm 338 includes a first adjustment slot 404 and the second arm 340 includes a second adjustment slot 406. A first fastener 358 secures the first arm 338 to the upper support 324 at a desired location by fastening through the first adjustment slot 404. The first claw assembly 342 may be adjusted laterally by loosening the first fastener 358, sliding the first arm 338 to a desired position, and then tightening the first fastener 358 in the first adjustment slot 404 to the upper support 324. In a similar fashion, a second fastener 360 secures the second arm 340 to the upper support 324 at a desired location by fastening through the second adjustment slot 406. The second claw assembly 344 may be adjusted laterally by loosening the second fastener 360, sliding the second arm 340 to a desired position, and then tightening the second fastener 360 in the second adjustment slot 406 to the upper support 324.

Figure 5:
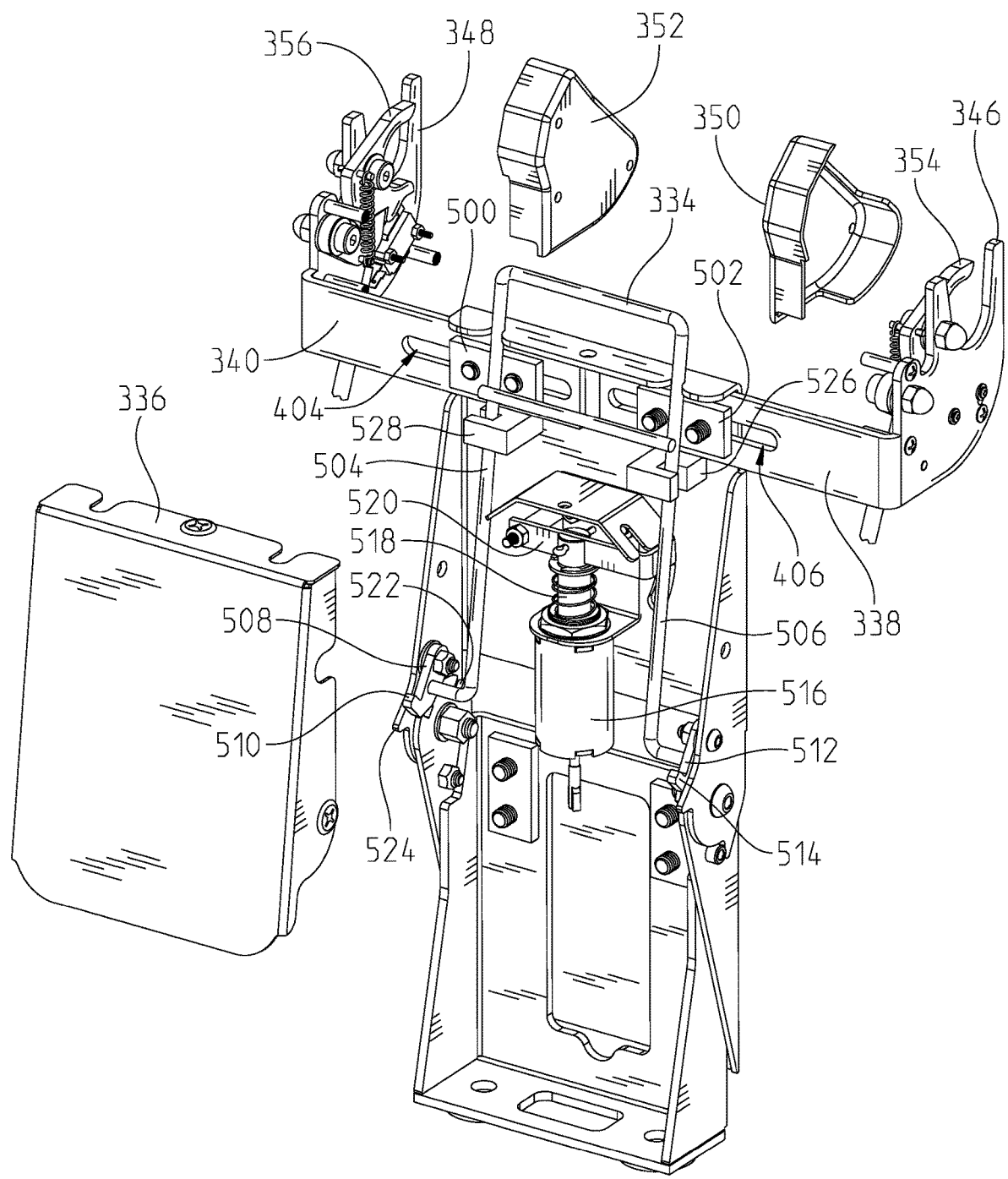
FIG. 5 is a partial exploded rear perspective view of the apparatus of FIG. 3.

Referring now to FIG. 5, the housing 336 is removed to better illustrate the internal components of the restraint apparatus 300. As shown, the first arm 338 and second arm 340 may be coupled to the upper support 324 via the first and second fasteners 358, 360 and a first adjustment plate 500 and a second adjustment plate 502. Both adjustment plates may include a pair of apertures such that two first fasteners 358 and two second fasteners 360 may be used to couple the arms to the upper support 324.

The handle 334 may include a first leg 504 and a second leg 506, as shown in FIG. 5. The first leg 504 may be slidably held by a bracket 528 and the second leg 506 may be held by a bracket 526. The brackets 526, 528 may be affixed to the upper support 324 such that neither bracket moves, but the legs are able to slide relative to the brackets. Moreover, the handle 334 is substantially U-shaped such that the legs extend downward from a substantially horizontal portion. Each leg further bends outwardly as shown and is connected at its ends to a latch. The first leg 504, for example, terminates and is connected to a first latch 508, and the second leg terminates and is connected to a second latch 512. The first latch 508 may include a first hook 510 and the second latch 512 may include a second hook 514.

Figure 6:
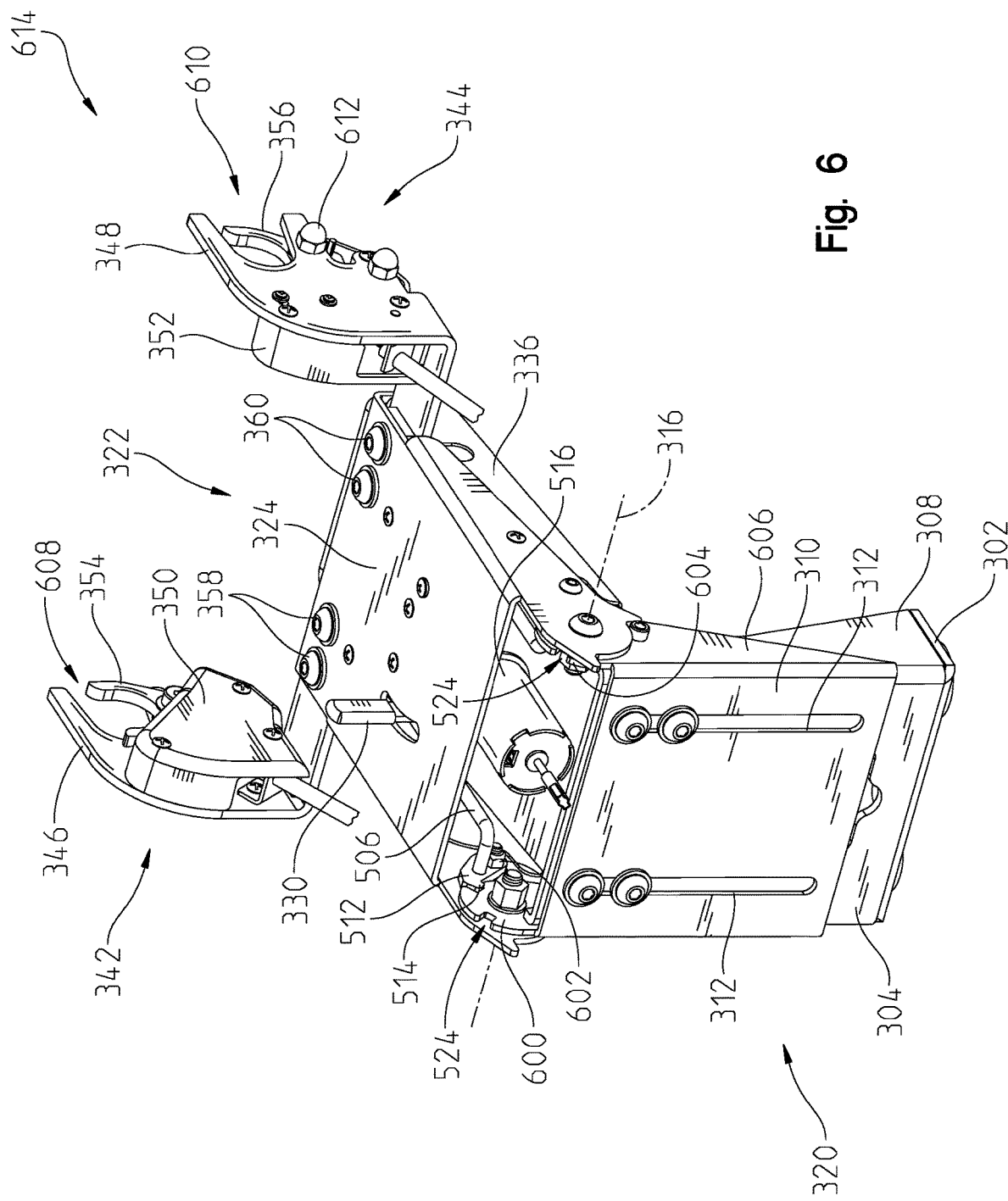
FIG. 6 is a front perspective view of the apparatus of FIG. 3 in its deployed configuration.

Referring to FIGS. 5 and 6, each hook of the respective latch is configured to engage one or more slots defined in the backing plate 310. The backing plate 310, for example, includes a pair of side members 606, and each side member comprises an extension. For instance, the backing plate 310 may include a first side member 606 having a first extension 600 and a second side member 606 having a second extension 604. Each extension includes the one or more slots described above. In FIGS. 5 and 6, for example, the first extension 600 may include a first slot 524 and a second slot 522. For sake of reference, the second slot 522 is shown in FIG. 6 wherein the second hook 514 is disposed therein. The second extension 604 may also include both slots such that the first hook 510 is configured to engage either hook depending upon the position of the apparatus 300.

In FIG. 5, the restraint apparatus 300 is disposed in its upright, unfolded position. In this position, the hook 510 of the first latch 508 may be disposed within the first slot 524 of the second extension 606 and the hook 514 of the second latch 512 may be disposed within the first slot 524 of the first extension 600. It is noted that in FIG. 5 the handle 334 is oriented backwards so that the hooks can be better seen. In the correct orientation, the hooks face inwardly towards the slots 522, 524 as best shown in FIG. 6.

In FIG. 6, the restraint apparatus 300 is disposed in its folded position 614. To get to this configuration, the handle 334 may be lifted to disengage the hooks 510, 514 from the first slots 524 in both extensions. As this is done, the upper portion 322 is now able to pivot about pivot 318 and its defined pivot axis 316. The pivot 318 may further be defined by a pivot bolt or fastener 604 as shown in FIG. 6. Once the upper portion 322 is folded downwardly, the hooks 510, 514 may engage in the second slots 524 in both extensions, as shown in FIG. 6. The engagement of the hooks in the second slots 524 secures the upper portion 322 in a substantially perpendicular orientation with respect to the lower portion 320. For purposes of this disclosure, the folded position 614 of FIG. 6 may be referred to as the deployed position. It is in this position that a mobility device such as a wheelchair may be coupled to the restraint apparatus 300.

The solenoid 516 is only one of a plurality of components for controlling the lockability of the claw assemblies. In particular, the solenoid 516 may include a shaft or pin 518 in combination with a spring, as shown in FIG. 5. The spring may bias the shaft 518 to its raised position of FIG. 5. In an emergency situation or a user decides to release the claw assemblies from their locked positions, the safety release lever 330 may be actuated. In FIG. 6, for example, the lever 330 may be pulled or moved within the channel 328, and as it is moved, the lever 330 causes a tab 520 to compress the spring and further move the solenoid shaft 518. As this happens, the solenoid 516 may be energized to release both claw assemblies. This will be further described below.

Figure 7:
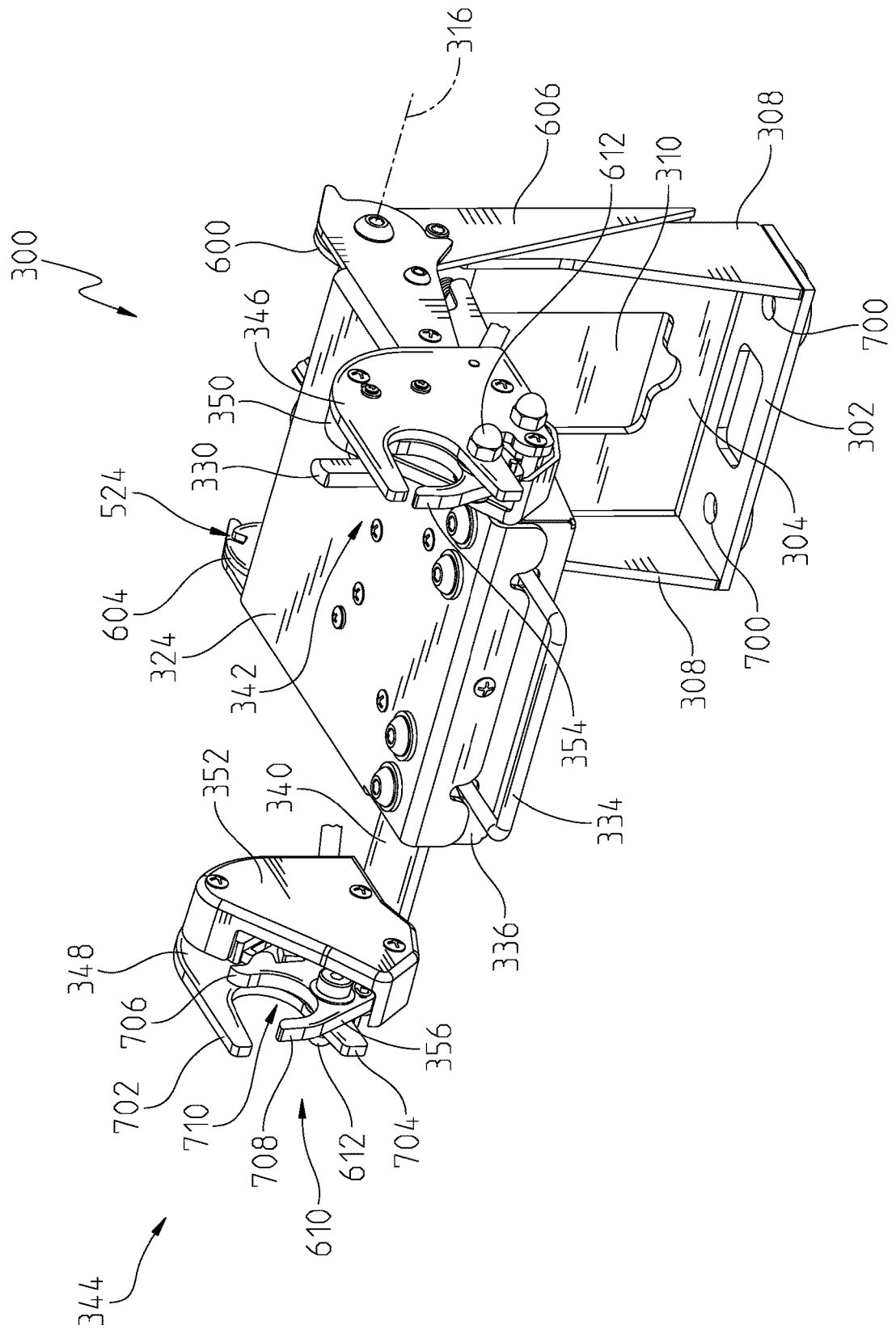
FIG. 7 is a rear perspective view of the apparatus of FIG. 3 in its deployed configuration.

In FIGS. 6 and 7, the first claw assembly 342 and the second claw assembly 344 are configured in their closed or latching positions. When in their open positions, the first claw assembly 342 defines a first opening 608 for receiving a portion of the mobility device, and the second claw assembly 344 defines a second opening 610 for receiving a portion of the mobility device.

The first claw member 346 and the second claw member 348 may include similar designs. In particular, both claw members may include a first prong 702 and a second prong 704. These prongs are disposed at a substantially horizontal orientation when in the folded position 614, and the prongs are spaced from one another to define the respective opening for receiving the mobility device. Moreover, the first claw member 346 may be integrally formed with the first arm 338 but disposed approximately perpendicularly with respect thereto. Moreover, the second claw member 348 may be integrally formed with the second arm 340 but also disposed approximately perpendicularly with respect thereto. Thus, as the first and second arms are adjusted laterally in either direction, the respective claw member (and thus claw assembly) moves in the same direction by the same distance.

The first latching member 354 and the second latching member 356 may include similar designs as well. For instance, both latching members may include a first finger 706 and a second finger 708. The first and second fingers may be spaced from one another to define an opening 710 for receiving the mobility device. In FIG. 7, for example, both latching members are disposed in their closed or latched positions. In the embodiment of FIG. 7, the first and second fingers are spaced a constant distance from another. As the first and second latching members are moved between their open and closed positions, or unlatched and latched positions, the respective members may pivot about a pivot axis defined by a pivot bolt 612 as shown in FIGS. 6 and 7.

Figure 8:
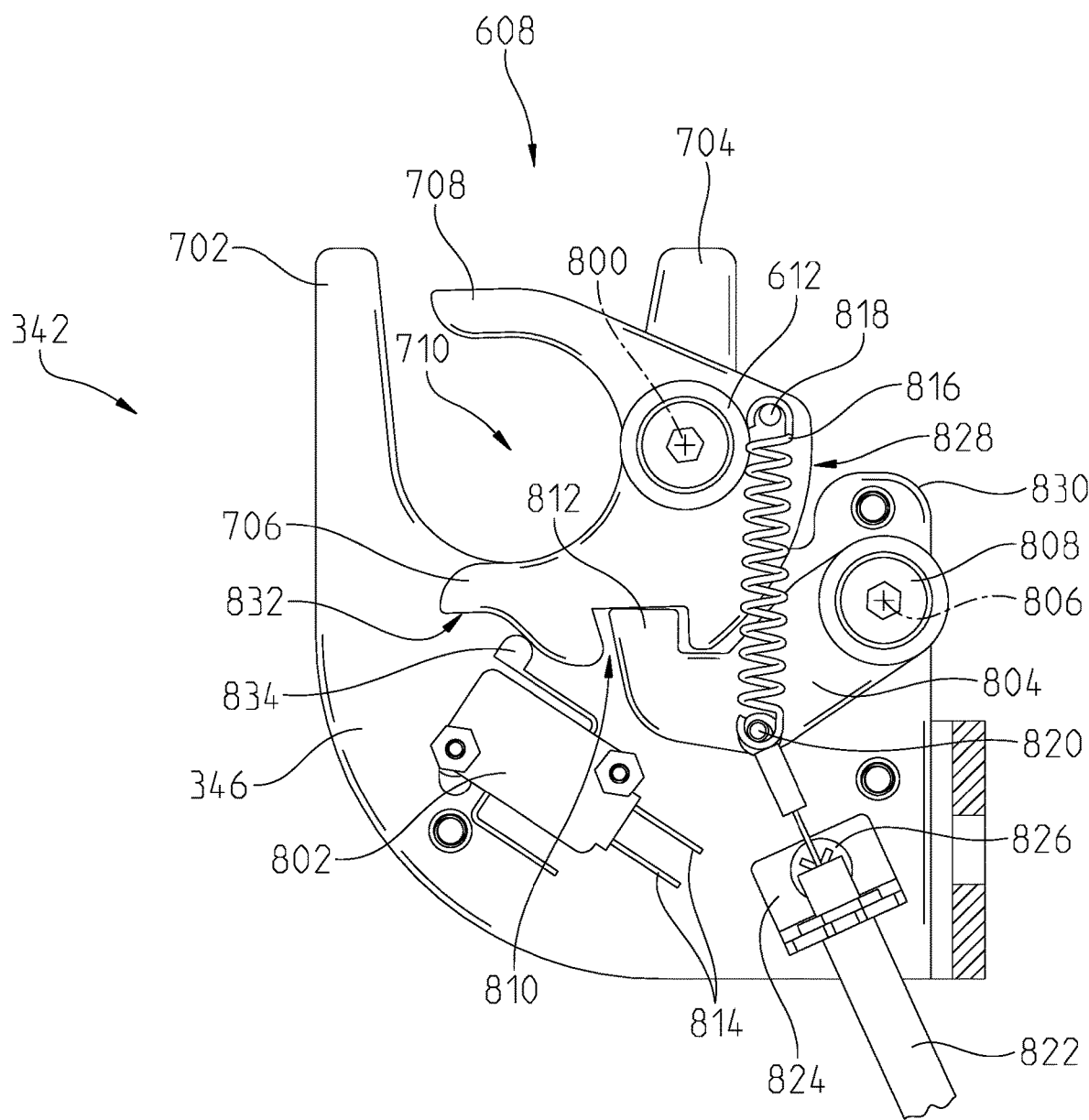
FIG. 8 is a side view of a claw assembly of the apparatus of FIG. 3.

In FIG. 8 of the present disclosure, the first claw assembly 342 is depicted in further detail with the cover 350 removed. The components and arrangement thereof may be similar for the second claw assembly 344 as well. Here, the claw assembly 342 includes the latching member 354 pivotally coupled to the first latch member 346 via a pivot axis 800 defined by the pivot bolt 612. The latching member 354 may be formed by a body having an outer curved surface 828 and a notch 810 defined therein. Moreover, the latching member 354 may include an outer body portion 832 that may come into contact with a switch 802 when in its closed position of FIG. 8. The switch 802 may include a contact arm 834 that is in contact with the body portion 832 in the position shown. When the latching member 354 is in its open or unlatched position, the body portion 832 may be moved out of contact with the contact arm 834 of the switch 802.

Besides the contact arm 834, the switch 802 may also include one or more electrical contacts 814. The electrical contacts 814 may be configured to connect to a wiring harness or cable for communicating a position of the latching member. In other words, the switch 802 may have at least two states. In a first state, the switch 802 may detect contact with the latching member 354 such that it is able to communicate that the latching member 354 is in its closed or latched position. In a second state, the switch 802 may not detect any contact with the latching member 354 and thus communicate that the latching member 354 is in its open or unlatched position. This will be described further below with respect to FIG. 11.

The first claw assembly 342 may also include a latch 804 as shown in FIG. 8. The latch 804 includes a body pivotally coupled to the first claim member 346 via fastener 808. The fastener 808 defines a pivot axis 806 about which the latch 804 may pivot. The latch body further includes a tab portion 812 that is configured to engage with the notch 810 defined in the first latching member 354 in the closed or latched position of FIG. 8. When the latch 804 is not engaged with the first latching member 354, the tab portion 812 may be in contact with the outer curved surface 828 of the first latching member 354.

In the embodiment of FIG. 8, the first claw assembly 342 may further include a first pin 818 and a second pin 820. The first pin 818 may be coupled to the first latching member 354, and the second pin 820 may be coupled to the latch 804. A spring 816 may be coupled between both the first pin 818 and the second pin 820 to bias the first latching member 354 to its unlatched or open position. In the unlatched or open position, the first pin 818 may come into contact with a notch portion 830 of the first claw member 346. This contact establishes a discrete stop whereby the first latching member 354 is unable to rotate clockwise about pivot axis 800 any further. In the closed or latched position of FIG. 8, however, the spring 816 may be extended as shown until the tab 812 engages with the notch 810. Upon engagement between the tab 812 and the notch 810, this establishes a second stop that is offset from the first stop. Thus, the first latching member 354 is able to pivot about pivot axis 800 between the first stop (i.e., contact between the first pin 818 and the notch portion 830) and the second stop (i.e., engagement between the tab 812 and the notch 810).

The first claw assembly 342 may also include a bracket 824 that is fastened to the first claw member 346 by a fastener 826. The bracket 824 may include a pair of prongs that extend upward (from the page in FIG. 8) and define a slot therebetween. A cable 822 or wiring harness may be disposed within the slot and connect at one end to the second pin 820.

Figure 9:
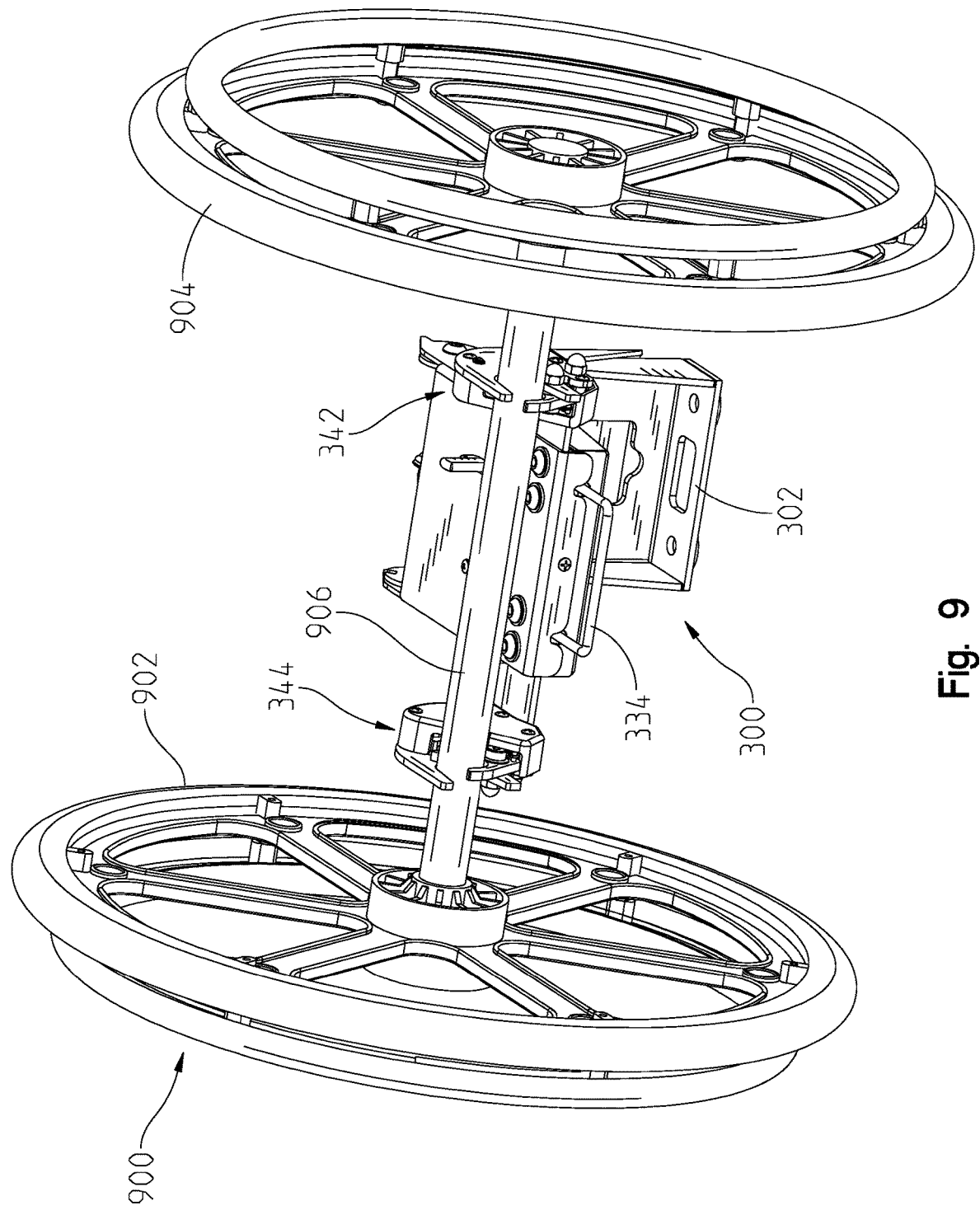
FIG. 9 is a perspective view of a partial wheelchair assembly coupled to the apparatus of FIG. 3.

During use, a mobility device such as a wheelchair 900 in FIG. 9 may be coupled to the restraint apparatus 300. With the first and second claw assemblies in their open or unlatched positions, the mobility device 900 may be rolled into contact with the claw assemblies. In FIG. 9, the mobility device 900 may include an axle 906 that extends between a first wheel 902 and a second wheel 904. The axle 906 may come into contact with the first latching member 354 and the second latching member 356 at two spaced locations along the length of the axle 906. In particular, the axle 906 may first come into contact with the first finger 706 of the respective latching members to induce pivotal movement of both latching members. As it does, both latching members may pivot about their respective pivot axes 800 in a counterclockwise direction.

As the latching members pivot in the counterclockwise direction, the tab 812 of each latch 804 may move along the outer curved surface of the respective latching member until the tabs 812 engage with the notches 810 in each latching member. At this point, the second finger 708 of both latching members has pivoted to the position shown in FIGS. 8 and 9 to latch the axle 906 to the restraint apparatus 300.

Figure 10:
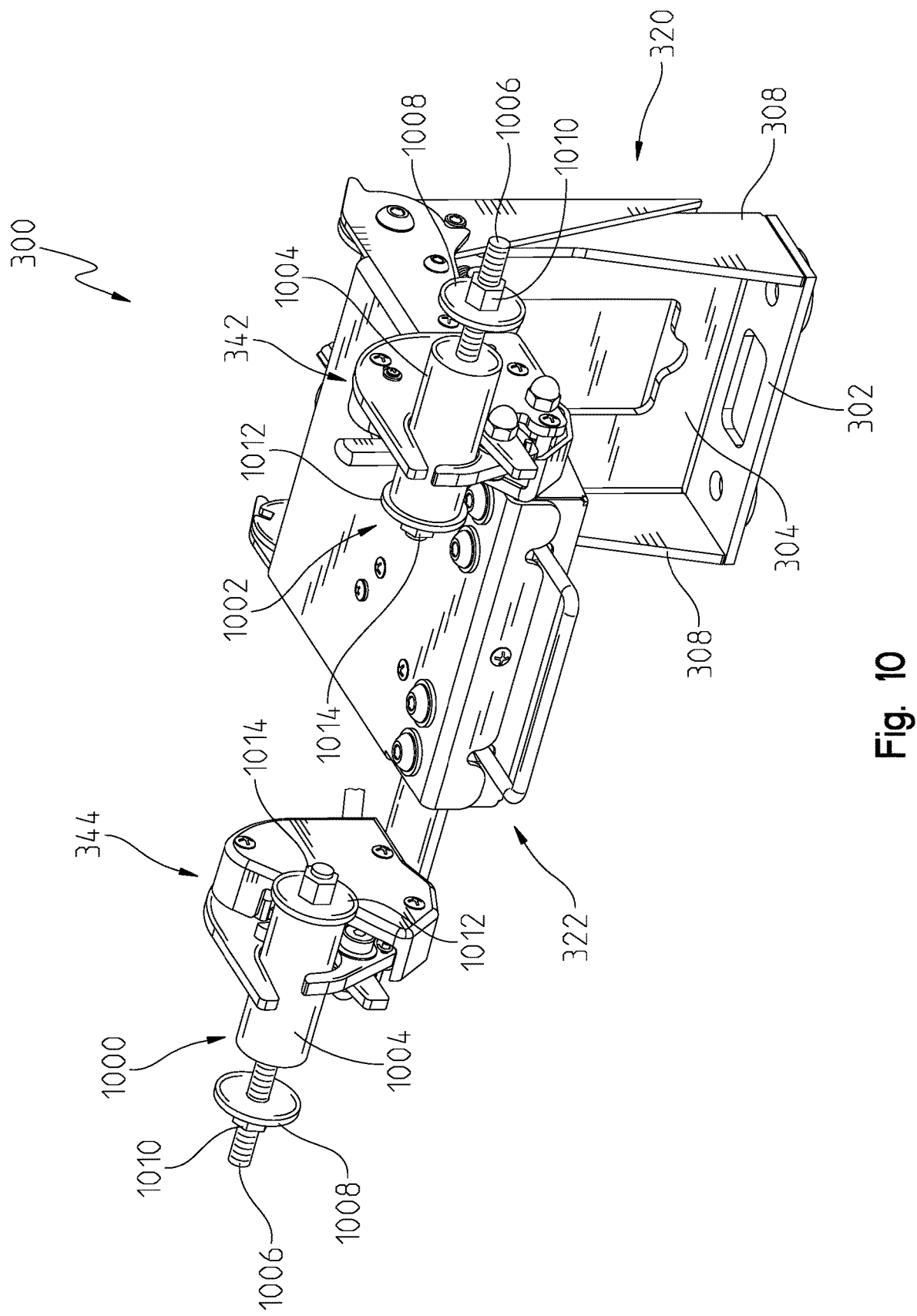
FIG. 10 is a perspective view of an alternative partial wheelchair assembly coupled to the device of FIG. 3.

In FIG. 10, an alternative embodiment of a mobility device is shown. In some instances, it is known that a mobility device such as a wheelchair may not include an axle to which the restraint device 300 can couple to. Thus, it may be necessary to use a pair of adapters for coupling the mobility device to the apparatus. Here, a first adapter 1000 may be coupled to the second claw assembly 344 and a second adapter 1002 may be coupled to the first claw assembly 342. The first adapter 1000 may include an axle tube 1004, a rod 1006, an outer washer 1008, an inner washer 1012, an outer fastener 1010 and an inner fastener 1014.

In the arrangement of FIG. 10, the axle tube 1004, both washers and both fasteners may comprise openings for sliding or fastening to the rod 1006. The inner fastener 1014 may couple the inner washer 1012 to the rod 1006 and axle tube 1004 on one side thereof, and the outer fastener 1010 may couple the outer washer 1008 to the rod 1006 and axle tube 1004 on an opposite side thereof. The second adapter 1002 may include the same features as the first adapter 1000.

Further, the first adapter 1000 and second adapter 1002 may be attached to a body of the mobility device. For example, if the mobility device is a wheelchair that does not include an axle but has at least two wheels, the adapters may be coupled to the wheelchair at a location of the rotation axis of both wheels.

To latch or couple the adapters to the restraint apparatus, the axle tube 1004 of the first adapter 1000 may be latched by the second claw assembly 344, and the axle tube 1004 of the second adapter 1002 may be latched by the first claw assembly 342, as shown in FIG. 10.

The embodiments of the mobility device in FIGS. 9 and 10 are not intended to be limiting. It is understood that mobility devices may come in many different shapes, sizes, and designs. Thus, whether the mobility device has its own axle or requires an adapter coupled to the device, the restraint apparatus 300 is designed to restrain movement of any type of mobility device.

Figure 11:
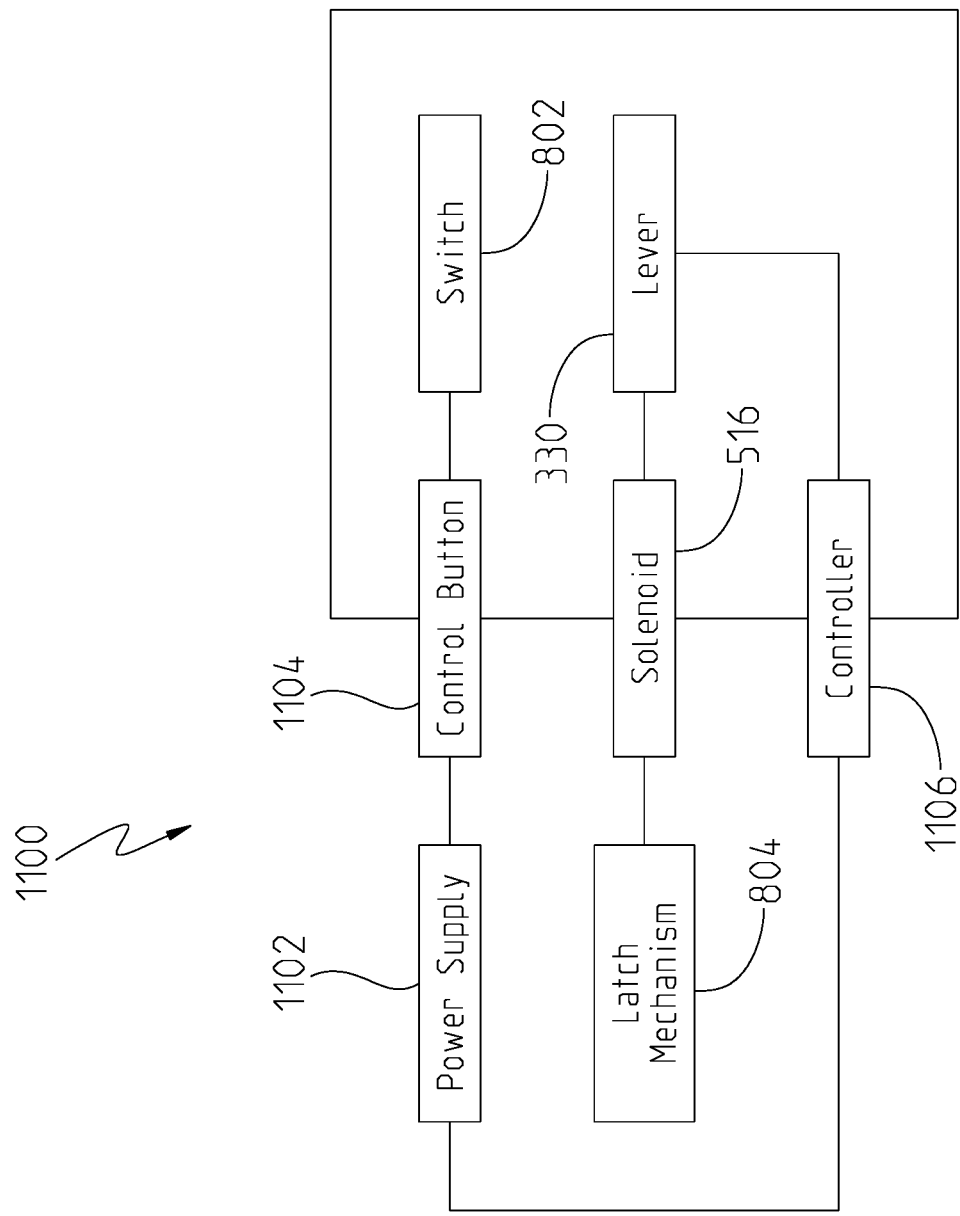
FIG. 11 is a schematic of a control system for controlling the restraint apparatus.

Referring now to FIG. 11, an embodiment of a control system 1100 for controlling the restraint apparatus 300 is shown. This embodiment is not intended to be limiting, but is only shown as one example of how the restraint apparatus 300 may be controlled. Here, the system 1100 may include a power supply 1102 such as a vehicle battery when implement in a transport vehicle. In other examples, any known power supply may be used for providing electrical power to the system 1100.

The restraint apparatus 300 may include a control button 1104 that may be coupled to the apparatus or located remotely from the apparatus 300. For example, in a transport vehicle, the control button 1104 may be located near the driver of the vehicle. Alternatively, it may be disposed on a door or other location near the apparatus 300. The location or placement of the control button 1104 is not intended to be limiting, and thus it may be located on, near or remote from the restraint apparatus.

The control button 1104, however, is electrically connected to the power supply 1102 in this embodiment. The button 1102 may include a light such as a light-emitting diode ("LED") or other visual indicator to indicate when the restraint apparatus 300 is in its latched position and coupled to the mobility device. Thus, in order to electrically power the light or other visual indicator, the power supply 1102 may supply the electrical power to do so.

The control button 1104 may also be in communication with the switch 802. As described above, the switch 802 is configured to detect when the respective latching member is in its latched position once it comes into contact with the contact arm 834. Upon detecting the latched position, the switch 802 may send a signal to the control button 1104 indicating this position and thus causing the light or other visual indicator to illuminate. Although not shown, the switch 802 may also be electrically coupled to the power supply 1102, if necessary.

The control button 1104 may also be in electrical communication with the solenoid 516. When a user wants to release the mobility device from the restraint apparatus, the user may press the control button 1104 which sends an electrical signal to the solenoid 516. The electrical signal may energize the solenoid 516, causing the cable 822 or harness to trigger the latch 804 (or latch mechanism) to release from its engagement with the latching member. As this happens, the latching member pivots about its pivot axis 800 and returns to its unlatched position. This also removes contact between the latching member and the contact arm 834 of the switch 802, causing the switch 1102 to communicate the unlatched position of the restraint apparatus 300 and thereby inducing the light or other visual indicator of the control button 1104 to shut off.

It is also worth noting that the safety release lever 330 may work in a similar fashion. Upon moving the safety release lever 330, the solenoid shaft 518 energizes the solenoid 516 thereby inducing the cable 822 or harness to trigger the latch 804 to disengage from the latching member and therefore result in the latching member pivoting to its unlatched position. This too may be detected by the switch 802 and communicated to the control button 1104 as described above.

Lastly, in FIG. 11, an optional controller 1106 is shown as part of the system 1100. The controller 1106 may be part of the vehicle controller or any other controller. The controller 1106 may include a memory and processor for executing a set of instructions or software for controlling the release of the restraint apparatus. The controller 1106 may be electrically coupled to the power supply 1102 and further in electrical communication with the control button 1104, the release lever 330, the solenoid 516, and in some instances the switch 802 (although not shown in FIG. 11).

In one example, the controller 1106 may be programmed to receive communications from the ignition switch on a transport vehicle to know when the vehicle is either turned on or shut off. The controller 1106 may energize the solenoid 516 in the event the ignition is shut off in order to release the mobility device from the restraint apparatus 300. This may be useful for when the vehicle has reached its intended destination, and the controller 1106 is able to automatically release the mobility device. In other instances, the controller 1106 may receive further confirmation from the switch 802 when the mobility device is latched to the restraint apparatus 300. Upon receiving this communication, the controller 1106 may communicate the same to the driver of the vehicle or the vehicle controller. In some instances, it may be possible to disallow the vehicle from shifting into a forward or reverse gear until the mobility device is securely latched to the restraint apparatus 300. Other safety considerations may be implemented in the control system 1100 of FIG. 11.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A restraint apparatus for securing a mobility device in a vehicle, comprising:
   at least one coupling for engaging with the mobility device;
   a support holding the coupling and being pivotally coupled about a horizontal axis to the vehicle for movement between a deployed position and a stowed position;
   the support presenting a footprint that is greater in the deployed position than in the stowed position.

2. A restraint apparatus for securing a mobility device in a vehicle, comprising:
   at least one claw assembly, the claw assembly comprising a claw member and a latching member, the latching member being pivotally coupled to the claw member about a pivot axis to enable the latching member to pivot between an unlatched position and a latched position;
   wherein, in the unlatched position, the claw member and latching member provide an access opening aligned along a horizontal axis for receiving an axle of the mobility device;
   wherein, in the latched position, the first and second latching members block the access opening.

3. The restraint apparatus of claim 1, wherein: the support comprises a first portion and a second portion; the first portion holds the coupling and is pivotally coupled about the horizontal axis to the second portion; and, the second portion is fixed to the vehicle.

4. The restraint apparatus of claim 3, wherein: the first portion is generally coplanar with the second portion in the stowed position; and, the first portion is generally normal to the second portion in the deployed position.

5. The restraint apparatus of claim 1, wherein the at least one coupling comprises a first coupling in spaced apart relation from a second coupling.

6. The restraint apparatus of claim 5, wherein the first coupling and second coupling are collectively configured for receiving an axle of the mobility device.

7. The restraint apparatus of claim 5, wherein at least one of the first coupling and the second coupling are moveable relative to the other to adjust a width therebetween.

8. The restraint apparatus of claim 7, wherein the first coupling and the second coupling are moveable relative to a floor of the vehicle to adjust a height therebetween.

9. The restraint apparatus of claim 1, wherein the at least one coupling is moveable relative to a floor of the vehicle to adjust a height therebetween.

10. The restraint apparatus of claim 1, wherein:
    the at least one coupling comprises a claw assembly;
    the claw assembly comprises a claw member and a latching member, the latching member being pivotally coupled to the claw member about a pivot axis to enable the latching member to pivot between an unlatched position and a latched position;
    in the unlatched position, the claw member and latching member provide an access opening configured for receiving an axle of the mobility device;
    in the latched position, the first and second latching members block the access opening.

11. The restraint apparatus of claim 1, wherein the support is pivotally coupled about the horizontal axis to a lifting device on the vehicle for coupling the mobility device to the lifting device.

12. The restraint apparatus of claim 2 further comprising a support holding the claw assembly, wherein the support is pivotally coupled about a horizontal axis to the vehicle for movement between a deployed position and a stowed position.

13. The restraint apparatus of claim 12, wherein: the support comprises a first portion and a second portion; the first portion holds the claw assembly and is pivotally coupled about the horizontal axis to the second portion; and, the second portion is fixed to the vehicle.

14. The restraint apparatus of claim 13, wherein: the first portion is generally coplanar with the second portion in a stowed position; and, the first portion is generally normal to the second portion in a deployed position.

15. The restraint apparatus of claim 14, wherein the support presents a footprint that is greater in the deployed position than in the stowed position.

16. The restraint apparatus of claim 2, wherein the at least one claw assembly comprises a first claw assembly in spaced apart relation from a second claw assembly.

17. The restraint apparatus of claim 16, wherein at least one of the first claw assembly and the second claw assembly are moveable relative to the other to adjust a width therebetween.

18. The restraint apparatus of claim 16, wherein the first claw assembly and the second claw assembly are moveable relative to a floor of the vehicle to adjust a height therebetween.

19. The restraint apparatus of claim 2, wherein a lifting device on the vehicle holds the claw assembly for coupling the mobility device to the lifting device.

20. A restraint apparatus for securing a mobility device to a lifting device in a vehicle, comprising:

a claw assembly, the claw assembly comprising a claw member and a latching member, the latching member being pivotally coupled to the claw member about a pivot axis to enable the latching member to pivot between an unlatched position and a latched position; and, wherein, in the unlatched position, the claw member and latching member provide an access opening configured for receiving a portion of the mobility device;

wherein, in the latched position, the first and second latching members block the access opening; and, the lifting device holds the claw assembly for coupling the mobility device to the lifting device.

\* \* \* \* \*